United States Patent
Monajemi et al.

(10) Patent No.: US 9,188,222 B2
(45) Date of Patent: Nov. 17, 2015

(54) NEGATIVE TORQUE UPSHIFT CONTROL

(71) Applicant: GM GLOBAL TECHNOLOGY OPERATIONS LLC, Detroit, MI (US)

(72) Inventors: Dara Monajemi, Lansing, MI (US); Matthew Pruski, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/249,379

(22) Filed: Apr. 10, 2014

(65) Prior Publication Data
US 2015/0292616 A1  Oct. 15, 2015

(51) Int. Cl.
| F16H 61/06 | (2006.01) |
| F16H 61/04 | (2006.01) |
| B60W 10/06 | (2006.01) |
| B60W 10/08 | (2006.01) |
| B60W 10/11 | (2012.01) |

(52) U.S. Cl.
CPC .............. *F16H 61/061* (2013.01); *F16H 61/04* (2013.01); *B60W 10/06* (2013.01); *B60W 10/08* (2013.01); *B60W 10/11* (2013.01); *F16H 2061/0496* (2013.01)

(58) Field of Classification Search
None
See application file for complete search history.

(56) References Cited

U.S. PATENT DOCUMENTS

| 8,579,762 | B2 | 11/2013 | Yacoub et al. |
| 2009/0319143 | A1 | 12/2009 | Kluemper et al. |
| 2011/0246009 | A1* | 10/2011 | Hase et al. ...................... 701/22 |

* cited by examiner

*Primary Examiner* — Ramya Burgess
*Assistant Examiner* — Timothy M Hannon
(74) *Attorney, Agent, or Firm* — Quinn Law Group, PLLC

(57) ABSTRACT

A vehicle includes a prime mover, input clutch, transmission, and controller. The transmission, which is selectively connected to the output shaft via the input clutch, has multiple friction clutches, including respective offgoing and oncoming clutches for a negative torque upshift. The controller includes a torque request module, offgoing clutch module, and oncoming clutch module. The torque request module limits input torque into the transmission during the negative torque upshift. The offgoing control module determines actual offgoing clutch torque capacity of the offgoing clutch, calculates an actual offgoing clutch pressure using the actual offgoing clutch torque capacity, and controls the offgoing clutch through the shift using the actual offgoing clutch pressure. The oncoming control module controls the oncoming clutch through multiple stages of control of the oncoming clutch, including a fill, staging, ramp, and quick-lock stage. Closed-loop pressure correction is provided via PID logic through the inertia and torque shift phases.

15 Claims, 2 Drawing Sheets ated engine torque, i.e., a total commanded engine torque less a baseline torque component needed to overcome the inertia of the engine, into a set of offgoing clutch pressure commands. Engine torque is typically used as a proxy for clutch torque in conventional negative torque upshift control. The present invention departs from this convention by recognizing that such a proxy is, at best, inexact. As a result, intensive calibrations are used in conventional control methods, with such calibrations relying heavily on feed-forward controls to force an offgoing clutch to a particular torque level suitable for engine torque levels and transmission input speeds. Additionally, clutch synchronization and communication between offgoing and oncoming controls may be less than optimal or missing altogether in prior art control approaches. All of this may lead to negative torque upshifts having an inconsistent quality or feel.

NEGATIVE TORQUE UPSHIFT CONTROL

TECHNICAL FIELD

The present disclosure relates to negative torque upshift control.

BACKGROUND

A typical automatic transmission includes a set of friction clutches that selectively couple rotatable input and output members of the transmission. Engagement of the friction clutches in different combinations connects ring gear, sun gear, and carrier members of one or more planetary gear sets together to achieve a desired transmission output speed ratio. A clutch-to-clutch shift from one transmission output speed ratio to another is performed automatically in response to commands from a controller. A clutch associated with the current speed ratio, i.e., the offgoing clutch, is released, and a clutch associated with a desired new speed ratio is applied, with the newly applied clutch referred to as the oncoming clutch.

When engine torque is positive in a clutch-to-clutch upshift, the oncoming clutch reacts against output torque from the engine. This reaction acts to pull down turbine speed to a level that is more suitable for the commanded gear. However, under some circumstances the direction of engine output torque can become negative, for instance during a regenerative braking event or during certain coasting conditions. An upshift of the transmission commanded during a period of negative engine torque is referred to as a negative torque upshift.

SUMMARY

A vehicle is disclosed herein. In a possible embodiment, the vehicle includes an internal combustion engine, a torque converter having a turbine, a transmission having a plurality of friction clutches, and a controller. The controller is configured, i.e., equipped in hardware and programmed in software, to automatically control the offgoing and oncoming clutches during a negative torque upshift. In a negative torque upshift, turbine speed will naturally decrease to the speed of a target gear ratio. Using the oncoming clutch as the main control element is generally not desirable because doing so may cause turbine speed to decrease more rapidly than desired. This in turn may lead to less than optimal shifts. Therefore, the offgoing clutch serves as the main control element in a negative torque upshift. Control of the oncoming clutch should be properly synchronized with the offgoing in order to optimize shift quality. The present control methodology is intended to improve the overall feel and efficiency of such a negative torque upshift.

As is well known in the art, negative torque upshifts are conventionally controlled by converting an inertia-compensated engine torque, i.e., a total commanded engine torque less a baseline torque component needed to overcome the inertia of the engine, into a set of offgoing clutch pressure commands. Engine torque is typically used as a proxy for clutch torque in conventional negative torque upshift control. The present invention departs from this convention by recognizing that such a proxy is, at best, inexact. As a result, intensive calibrations are used in conventional control methods, with such calibrations relying heavily on feed-forward controls to force an offgoing clutch to a particular torque level suitable for engine torque levels and transmission input speeds. Additionally, clutch synchronization and communication between offgoing and oncoming controls may be less than optimal or missing altogether in prior art control approaches. All of this may lead to negative torque upshifts having an inconsistent quality or feel.

The present system and method are intended to help solve these potential control problems. The controller described herein uses a negative torque upshift (NTU) control methodology as part of its overall shift control logic. A processor of the controller, via the NTU control methodology, calculates an actual offgoing clutch torque, and then uses the calculated actual offgoing clutch torque to calculate offgoing clutch pressure through multiple stages of the negative torque upshift. The NTU control methodology described herein includes an offgoing control module, an oncoming control module, and a torque request module, all of which work together seamlessly to help optimize shift feel and reduce the control complexity of a negative torque upshift.

The torque request module disclosed herein is a specific hardware/software block that requests a limited amount of negative input torque from the engine or other prime mover in response to a detected negative torque upshift request. The limited negative input torque is then fed into the offgoing control module, another hardware/software block which calculates the required clutch torque and pressure for the offgoing clutch. This occurs through five distinct control stages: slip, inertia phase, near-sync boost, post-sync, and exhaust control. At the same time, oncoming clutch control is optimized via the oncoming control module through four oncoming control stages: fill, stage, slow ramp, and quick-lock. All of the stages of offgoing and oncoming control are described in further detail hereinbelow.

The above features and advantages and other features and advantages of the present invention are readily apparent from the following detailed description of the best modes for carrying out the invention when taken in connection with the accompanying drawings.

DETAILED DESCRIPTION

Figure 1:
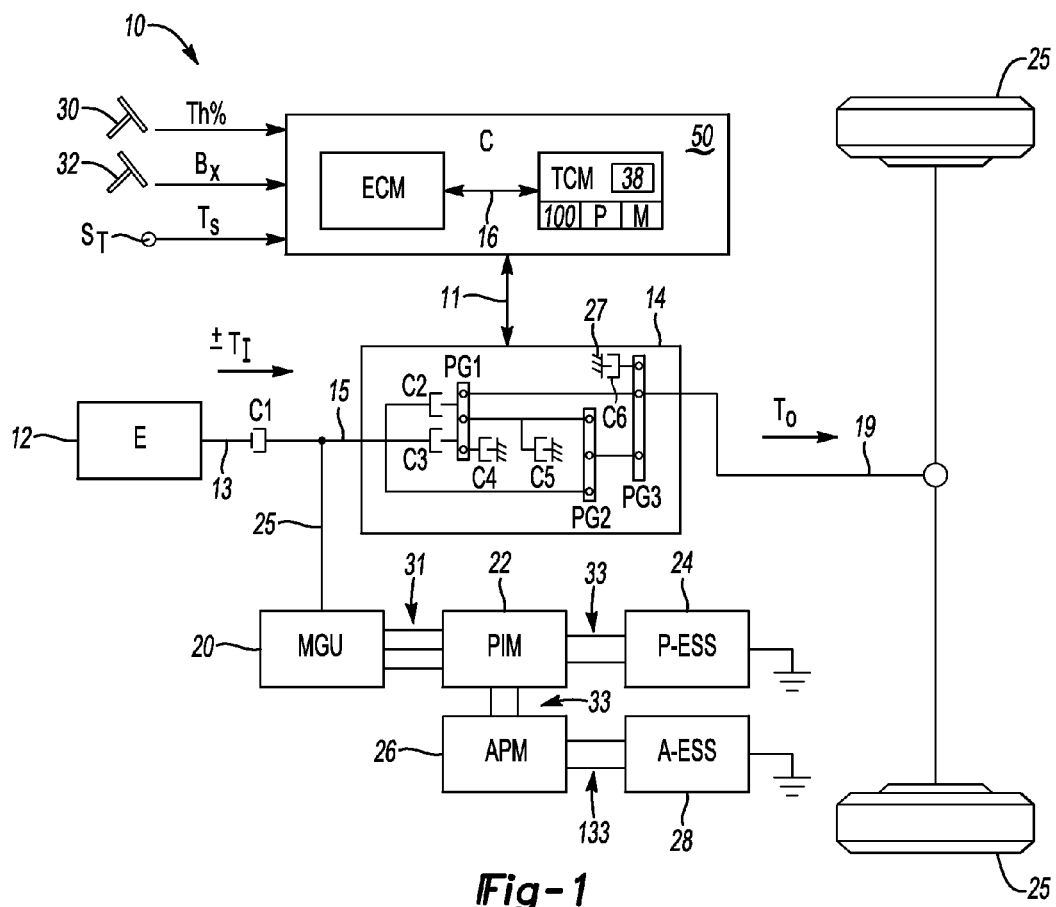
FIG. 1 is a schematic illustration of an example vehicle having an automatic transmission and a controller programmed to control a negative torque upshift of the transmission as set forth herein.

Referring to the drawings, wherein like reference numbers correspond to like or similar components throughout the several figures, and beginning with FIG. 1, an example vehicle 10 includes a controller (C) 50. The controller 50 is configured, via the necessary hardware and associated software programming embodied as the control logic 100 of FIG. 3, to control a negative torque upshift of the type described above. The controller 50 may include an engine control module (ECM) and a transmission control module (TCM) in communication with each other, e.g., over a controller area network (CAN) bus 16 as shown, with the TCM being, in the non-limiting example of FIG. 1, the particular control module of the controller 50 that is programmed to execute the control logic 100.

The vehicle 10 of FIG. 1 may include a prime mover such as an internal combustion engine (E) 12. The engine 12 is coupled to an automatic transmission (T) 14 via an input clutch C1, for instance a hydrodynamic torque converter or a conventional friction clutch. The engine 12 may deliver positive or negative engine torque ($\pm T_{IN}$) to the transmission 14 via an engine shaft 13 depending on control circumstances, with positive and negative torque being a rotational force from the engine 12 in different rotational directions. The engine shaft 13 is selectively connected to an input member 15 of the transmission 14. The transmission 14 also includes an output shaft 19 that ultimately conveys output torque (arrow $T_O$) to a set of drive wheels 25.

Within the transmission 14 of FIG. 1, multiple gear sets such as three gear sets PG1, PG2, and PG3 are selectively engaged via a set of friction clutches, for instance five clutches C1, C2, C3, C4, C5, via electro-hydraulic controls (not shown). The friction clutches C1-C5 are applied via fluid (not shown) that is circulated under pressure from a fluid pump and flow control valves (not shown) so as to connect nodes/members of the various gear sets PG1, PG2, PG3 together or to a stationary member 27 of the transmission 14. As is known in the art, the term "nodes" may encompass sun, ring, and carrier gear elements in a typical planetary gear configuration. The transmission 14 of FIG. 1 may be a multispeed transmission, for instance an 8-speed transmission, although the transmission 14 is not limited to such an embodiment.

In some embodiments, the vehicle 10 may be a hybrid electric vehicle, and therefore may also include various electric powertrain elements. For example, the vehicle 10 may include a high-voltage motor/generator unit (MGU) 20. A rotor shaft 25 of the MGU 20 may be connected to the input member 15 of the transmission 14 as shown. When configured as an alternating current (AC) machine, the MGU 20 may be supplied with high-voltage AC power by a power inverter module (PIM) 22 over a high-voltage AC bus 31. The PIM 22 in turn may output high-voltage direct current (DC) power to a propulsion energy storage system (P-ESS) 24 via a high-voltage DC bus 33. An auxiliary power module (APM) 26 such as a DC-DC converter may be used to connect to the PIM 22 via the high-voltage DC bus 33 as shown, with a 12-15 VDC auxiliary voltage output provided by the APM 26 via an auxiliary DC bus 133 to an auxiliary energy storage system (A-ESS) 28. In such a configuration, the term "high-voltage" refers to any voltage levels in excess of auxiliary levels, typically 30 VDC-300 VDC or higher.

Figure 3:
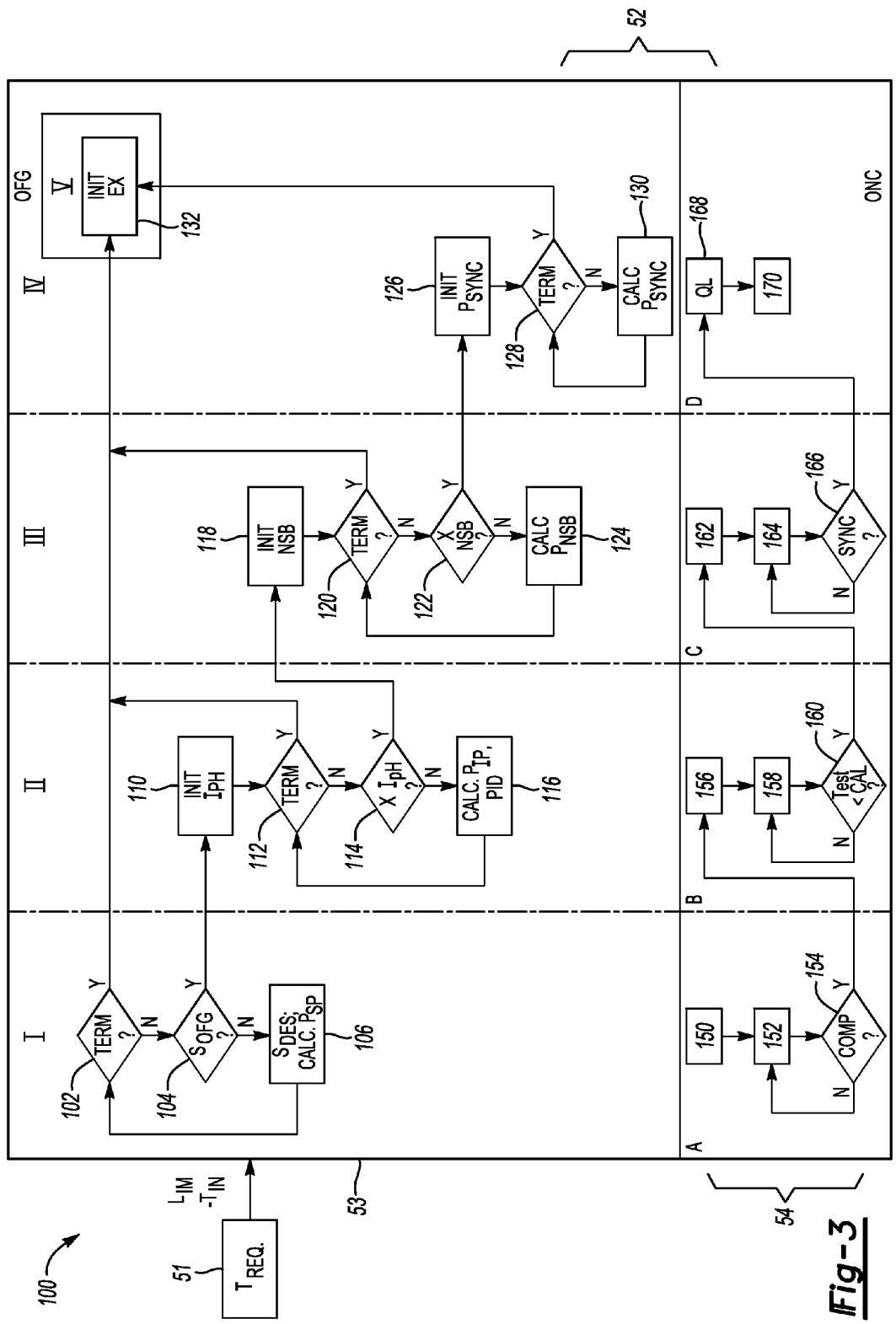
FIG. 3 is a flow chart describing example control logic for controlling a negative torque upshift.

The controller 50 of FIG. 1 selectively executes the control logic 100, an example of which is shown in FIG. 3, by executing, during a negative torque upshift of the vehicle 10 via a processor P, associated computer code or instructions. Such instructions may be pre-recorded on tangible, non-transitory memory M. Inputs to the controller 50 may include a throttle level (arrow Th %) from a throttle input device 30, such as an accelerator pedal, a braking level (arrow $B_X$) from a brake pedal 32, and a fluid sump temperature (arrow $T_S$) from a temperature sensor $S_T$, with the term "sump" referring to a reservoir or fluid sump (not shown) containing a supply of transmission fluid for the transmission 14.

The controller 50 may be configured as a microprocessor-based computing device having such common elements as the processor P and memory M, the latter including tangible, non-transitory memory devices or media such as read only memory (ROM), random access memory (RAM), optical memory, flash memory, electrically-programmable read-only memory (EPROM), and the like. The controller 50 may also include any required logic circuitry including but not limited to proportional-integral-derivative (PID) control logic 38, a high-speed clock, analog-to-digital (A/D) circuitry, digital-to-analog (D/A) circuitry, a digital signal processor or DSP, and the necessary input/output (I/O) devices and other signal conditioning and/or buffer circuitry.

The controller 50 is programmed, among other things, to execute a negative torque upshift control methodology as disclosed herein, and to control the transmission 14 of FIG. 1 according to the methodology via a set of control signals (double-headed arrow 11). Thus, any pressure control commands transmitted to the transmission 14 in the course of executing the control logic 100, such as the pressure commands illustrated as traces 42 and 44 of FIG. 2, may be transmitted as part of the set of control signals indicated by double-headed arrow 11.

As is well understood in the art, the term "PID control" refers to a closed-loop feedback mechanism using three control terms: a proportional (P) term, an integral (I) term, and a derivative (D) term, with each term representing the respective present, past, and future error values. A controller using PID controls, such as the present controller 50, calculates an error value in a given process variable as a difference between a measured value and a desired or calibrated value and then controls the process inputs as a function of the P, I and D control terms. Specifically, the controller 50 selectively uses closed-loop PID correction on offgoing clutch pressure, trace 44 of FIG. 2, during the inertia and torque phases of the negative torque upshift as explained below.

Figure 2:
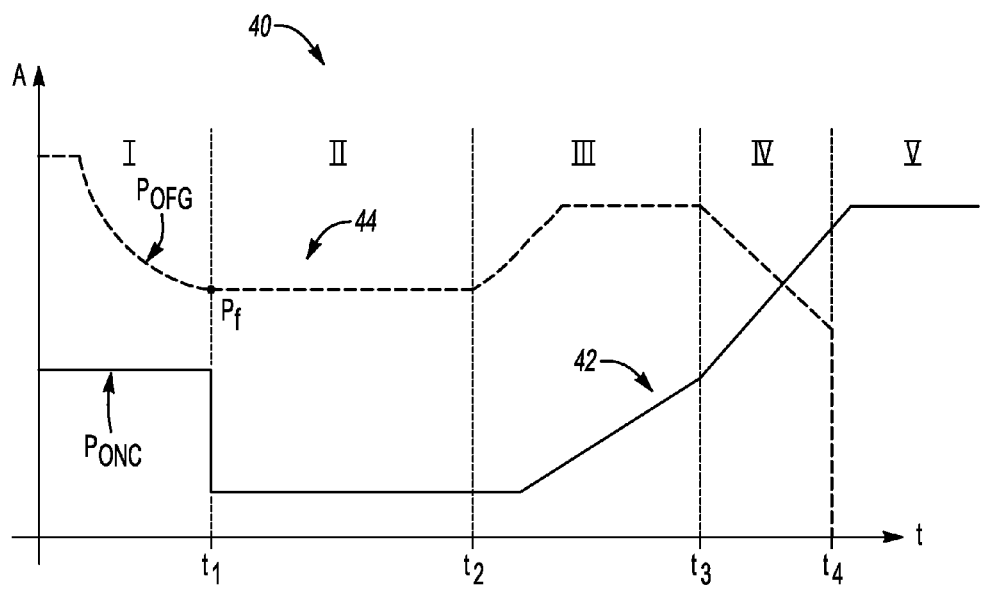
FIG. 2 is an example time plot of various vehicle parameters used by the controller of FIG. 1 in controlling a negative torque upshift.

Referring to FIG. 2, a set of example traces 40 describes the commanded oncoming and offgoing clutch pressures, $P_{ONC}$ and $P_{OFG}$, respectively, through five stages (I-V) of an example negative torque upshift. Trace 42 describes the commanded oncoming clutch pressure $P_{ONC}$, while trace 44 describes the commanded offgoing clutch pressure $P_{OFG}$. As used herein, "commanded" refers to pressure control values generated by the controller 50 of FIG. 1 which ultimately achieve the control result described below with reference to FIG. 3. In FIG. 2, time (t) is plotted in the horizontal axis and amplitude (A) is plotted on the vertical axis. The various offgoing stages of control (I-V), which are described in more detail below with reference to FIG. 3, include Slip Control (Stage I), Inertia Phase Control (Stage II), Near-Sync Boost Control (Stage III), Post-Sync Control (Stage IV), and Exhaust Control (Stage V).

The control logic 100, an example of which will now be described with reference to FIG. 3, controls the negative torque upshift through each of the four stages stages of control I-IV via the use of an actual calculated clutch torque and selective PID-based closed-loop pressure correction, and via a coordinated handoff between the offgoing and oncoming clutches once these clutches have synchronized. Additionally, the controller 50 of FIG. 1 temporarily limits the negative input torque seen by the transmission 14 of FIG. 1 during the negative torque upshift, via control of the engine 12 in conjunction with the ECM shown in FIG. 1, with all of these aspects of the control logic 100 collectively providing higher quality negative torque upshifts with reduced control complexity.

Referring to FIG. 3, the controller 50 of FIG. 1 includes a torque request module ($T_{REQ}$) 51 and a negative torque upshift (NTU) module 52, i.e., any associated hardware and software needed for executing the NTU control methodology described hereinafter with reference to the logic flow of FIG. 3. The NTU module 52 includes an offgoing (OFG) control module 53 and an oncoming (ONC) control module 54. All modules are embodied as hardware and software, and may be integrated into the controller 50. The term "module" is therefore used herein in the context of the computer arts, that is, as an individual segment or portion of the controller 50 designed to perform a particular assigned task. Use of the term "module" to describe the structural components of the controller 50 of FIG. 1, however, is intended to clarify the respective input, offgoing, and oncoming control functions of the controller 50 as opposed to necessarily indicating a separateness of structure. The structure of the modules may be separate, or the modules may be integrated together without departing from the intended inventive scope.

The torque request module 51 is programmed to request a limited rate of negative input torque (LIM–$T_{IN}$) from the engine 12 or other prime mover in response to a negative torque upshift request. For example, the ECM of FIG. 1 may be requested by the TCM to perform an engine control action, such as via retarding of spark timing. The limited rate may be calculated as a function of engine torque, for instance linearly limiting the rate of negative input torque such that the greater the input torque from the engine 12 or MGU 20, the more the input torque is limited. The rate information could be calibrated and stored in memory (M) of the controller 50. The limited negative input torque (LIM–$T_{IN}$) effectively provides an input torque offset at the start of the negative torque upshift and thereafter decreases engine torque at a calibrated rate, e.g., as a linear ramp, to an unmanaged torque level. As is known in the art, the term "unmanaged torque" refers to a torque level that the engine 12 will achieve absent active control.

The limited negative input torque (LIM–$T_{IN}$) is fed into the NTU module 52. The offgoing control module 53 calculates the required clutch torque and pressure of a designated offgoing clutch for the clutch-to-clutch negative toque upshift through the five control stages as noted above, with specific examples set forth below as to how such calculation is performed. Using the oncoming control module 54, oncoming clutch control is optimized through fill, stage, slow ramp, and quick lock stages (A, B, C, and D, respectively).

In order to activate the control logic 100, the controller 50 of FIG. 1 may first detect or otherwise determine if a negative torque upshift is present. For an example negative torque upshift event, pressure should be initially applied to the throttle input device 30 of FIG. 1 and the vehicle 10 should be gaining speed. The driver of the vehicle 10 then reduces pressure or another input request to the throttle input device 30 such that engine torque quickly drops and thereafter turns negative. A regenerative braking event during an upshift is another possible entry condition to a negative torque upshift.

Example threshold conditions for the control logic 100 may include a sump temperature ($T_S$) measured by the sensor $S_T$ of FIG. 1 rising above a calibrated temperature threshold, turbine speed and engine torque falling being below respective speed or torque thresholds, and engine speed being above another speed threshold. If a torque converter is used as the input clutch C1 in FIG. 1, and the torque converter clutch of such a device is not locked and slip is not actively controlled across such the torque converter clutch, another condition could be for the slip across such a clutch to be less than a calibrated threshold. The control logic 100 enters the slip control stage of the shift, i.e. Stage I, when conditions indicate the presence of a requested negative torque upshift.

Slip Stage I

Stage I, which includes steps 102, 104, and 106, is intended to actively slip the offgoing clutch for the negative torque upshift and thereby force turbine speed to "break away" from a calibrated speed corresponding to an attained gear ratio. Referring briefly to FIG. 2, trace 44 between $t_0$ and $t_1$ decreases at a calibrated rate, which coincides with the slip occurring across the offgoing clutch. A point $P_f$ at which the decay stops is a pressure value that is used in the overall control logic 100 as explained below.

At step 102 of FIG. 3, the controller 50 of FIG. 1 next determines if termination (TERM) conditions have been satisfied. Example termination conditions include the shift has timed out or offgoing clutch pressure has reached a low threshold, e.g., zero. If such conditions occur, the control logic 100 proceeds to step 132. Otherwise, step 104 is executed to determine if the offgoing clutch has commenced slipping.

At step 104, if slip occurs across the offgoing clutch ($S_{OFG}$), with such slip being measured and/or calculated, the control logic 100 proceeds to step 110 in Phase II. Otherwise, the control logic 100 executes step 106.

Step 106 entails updating a value for desired slip time, i.e., $S_{DES}$, as a clutch adapt using the information from steps 102-104. The controller 50 can then calculate the offgoing clutch pressure for the slip phase, i.e., $P_{SP}$ and then repeat step 102 with this updated profile.

In the slip control phase, offgoing clutch pressure can be calculated as an output of transmission lever ratios, engine inertia, turbine inertia, as is known in the art. Offgoing clutch pressure may be represented as follows:

$$P_{OFG}=K \cdot T_C + \text{Offset} + \Delta P + P_{RS}$$

where K is a calibrated gain, $T_C$ is clutch torque from the aforementioned lever ratios, $\Delta P$ is the change in pressure from the prior shift based on adaptive correction, Offset includes any offsets such as temperature compensation, e.g., from a lookup table, and $P_{RS}$ is the return spring pressure for the offgoing clutch whose pressure is being calculated. In FIG. 2, $P_f$ may calculated as Pi–$\Delta P$, with $\Delta P$ calculated as $K \cdot (P_i - P_t)$, with $P_i$ being the initial offgoing clutch pressure and $P_t$ being the target slip pressure for the slip that Stage I is trying to achieve.

Inertia Phase

Step 110 includes initiating the inertia phase of the negative torque upshift. Once initiated, the control logic 100 proceeds to step 112 to determine if termination conditions are present, similarly to those executed at step 102. Assuming termination conditions are not present, the control logic 100 executes step 114 to determine if conditions are appropriate for exiting the inertia phase ($XI_{PH}$). Typically, step 114 is a function of time. That is, the control logic 100 proceeds to step 118 of Phase III (Near-Sync Boost) if estimated time to synchronization, i.e., a time to reach a speed of a target gear ratio, is less than a calibrated threshold.

The control logic executes step 116 if the inertia phase does not time out at step 114. At step 116, the controller 50 of FIG. 1 calculates the inertia phase pressure ($P_{IP}$) for the offgoing clutch, and adjusts this value as necessary using PID logic 38. Steps 112, 114, and 116 are repeated in a loop until step 112 or step 114 dictate that the control logic 100 should proceed to stage III or IV.

In step 116, the controller 50 may calculate the offgoing clutch pressure as follows:

$$P_{OFG}=P_t+\text{PID}$$

where $P_t$, the target feed-forward pressure, is updated each shift. PID logic 38 is active in the inertia phase and torque phase of the NTU shift so as to force turbine speed, i.e., the speed of the output clutch C1 in FIG. 1, to match a calibrated turbine speed profile through the inertia phase. The torque phase, which encompasses the near sync boost, post sync, and exhaust stages, acts as the "hand-off" portion of a shift between the offgoing and oncoming clutches. Active PID control thus runs from the start of the inertia phase through the end of torque phase, i.e., through all the offgoing control states through the end of Stage III. Inputs to the PID logic 38 of FIG. 1, i.e., closed-loop correction logic, may include the type of shift, e.g., 1-2, 2-3, etc., error (difference between actual and desired turbine speed) and the derivative of the error term (d/dtE). The PID gains $K_P$, $K_I$, $K_D$ may be obtained from a lookup table. The end goal of Stage II is to hold turbine speed close to a desired profile.

Stage III: Near-Sync Boost

Stage III, near-sync boost (NSB), initiates at step 118. At step 120, the controller 50 determines if Stage III should be terminated, similarly to steps 102 and 112. If so, the control logic 100 proceeds to step 132. Otherwise, the control logic 100 executes step 122, wherein the controller 50 determines if conditions warrant exiting stage III (X NSB). The controller 50 remains in Stage III until turbine speed has achieved and maintained the target gear ratio synchronization speed for a calibrated amount of time, or a near-sync boost state timer times out at step 122. At that point, the control logic 100 proceeds to step 126. While in near-sync boost, the controller 50 calculates the near-sync boost pressure ($P_{NSB}$) at step 124.

Clutch torque in Stage III may be calculated as follows:

$$T_{NSB}=T_{CIP}+\Delta T$$

where $T_{CIP}$ is the clutch torque at the end of the inertia phase, i.e., from step 116. $\Delta T$ may be calculated as $\Delta T=K*T_{E(IC)}+$ Offset, where K is a calibrated gain, $T_{E(IC)}$ is inertia compensated engine torque, and Offset is a calibrated offset, e.g., a value determined as a function of temperature, torque, and/or speed of the vehicle 10. Offgoing pressure is then calculated via the clutch torque to pressure conversion approach noted above. Similar to the Inertia Phase, PID closed-loop correction is applied through this phase of the shift which adjusts the offgoing pressure to keep turbine speed close to a desired profile.

Stage IV: Post-Sync

Stage IV commences at step 126, where the controller 50 initiates the post-sync stage of control (INIT $P_{SYNC}$). As with steps 102, 112, and 120, step 128 determines if termination conditions are present that warrant immediate transition to step 132 and the exhaust phase (Stage V). If not, the control logic 100 executes step 130 to calculate the post-sync pressure $P_{SYNC}$. This calculation continues in a loop with step 128 until the post-sync stage is complete, at which point the control logic 100 executes step 132.

At stage IV, the controller 50 drops pressure at a calibrated rate until a threshold is reached, with the threshold being a calibrated level below the return spring pressure. This decay of pressure can be seen in trace 44 of FIG. 2 commencing at $t_3$.

Stage V: Exhaust

Step 132 is initiates the exhaust phase of control for the offgoing clutch, as indicated by INIT $E_X$. As shown at $t_4$ of FIG. 2, step 132 effectively dumps the offgoing clutch pressure to exhaust (0 kPa) to allow the shift to end.

Oncoming Clutch Control

Referring again to FIG. 2, control of the oncoming clutch proceeds in comparable stages, with oncoming clutch pressure (trace 42) stepped up at $t_0$ and held until $t_1$ through the slip phase (Stage I) of offgoing clutch control. The oncoming clutch is then staged at a calibrated offset below return spring value until shortly after $t_2$, i.e., the near-sync boost stage (Stage III), at which point oncoming pressure is ramped up at a calibrated rate. A steeper rate may be commanded at $t_3$, i.e., Stage IV or post-sync, with clutch pressure leveling off at a calibrated maximum at $t_4$ as the offgoing clutch is exhausted.

In FIG. 3, oncoming clutch control is explained in four stages A, B, C, and D, i.e., fill, oncoming stage, slow ramp, and quick lock, respectively. Each will now be described in turn.

Oncoming Fill: Stage A

Fill of the oncoming clutch is initiated at step 150. The control logic then proceeds to step 152 where the clutch is filled to a predetermined end-of-fill level, e.g., a calibrated percentage of fill needed to exit the stage. This is seen in FIG. 2 between $t_0$ and $t_1$. At step 154, the controller 50 determines if such an end-of-fill level as been achieved. Step 152 is repeated until the predetermined level is achieved, at which point the control logic 100 proceeds to step 156 and Phase B.

Oncoming Stage: Stage B

Staging of the oncoming clutch commences at step 156. At step 158, the controller 50 maintains the oncoming clutch at a staged pressure, as indicated by trace 42 of FIG. 2 starting at $t_1$. The staged pressure may be determined as a function of return spring pressure and an offset, e.g., a function of engine torque, turbine speed, and a cold offset. Using a timer, the controller 50 determines at step 160 whether an estimated time to synchronization is less than a calibrated duration. If not, the controller 50 repeats step 158. The controller 50 proceeds to Stage C and step 162 when the estimated time to synchronization is less than the calibrated duration.

Oncoming Slow Ramp: Stage C

Slow ramp of the oncoming clutch begins at step 162, which occurs in trace 42 of FIG. 2 shortly after $t_2$. At step 164, the controller ramps oncoming clutch pressure at a first calibrated rate. The ramp rate can be adjusted, e.g., via multiplication by a calibrated modification factor, depending on whether there is flare or divergence in the response, usually caused by insufficient offgoing pressure or too much offgoing pressure, respectively. If flare is present, a steeper rate may be used in Stage C, while a shallower rate may be used in the event of divergence. As this occurs, step 116 determines if synchronization has been achieved. Steps 164 and 166 repeat in a loop until synchronization is achieved.

Oncoming Quick Lock: Stage D

Quick lock is initiated at step 168, whereupon the oncoming pressure is set to a maximum calibrated value at step 170 upon achievement of sync at step 166. As part of step 170, a timer may be compared to a threshold, and a Boolean value may be set in memory M of the controller 50 indicating that the controller 50 should end synchronization control upon completion of stage D.

As noted above, the present approach departs from the convention of using engine torque as a proxy for clutch torque during negative torque upshift control. A result of use of the control logic 100 of FIG. 3 in the vehicle 10 of FIG. 1 is that intensive calibrations and feed-forward controls may be dispensed with. Additionally, synchronization and communication between the offgoing and oncoming controls is provided. When combined with the negative input torque-limiting functionality of the torque request module, a user may enjoy negative torque upshifts of consistent and improved quality.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a prime mover having an output shaft;
   an input clutch;
   a transmission that is selectively connected to the output shaft via the input clutch, and that has a plurality of friction clutches, at least one of which acts as a respective offgoing clutch and another at least one of which acts as an oncoming clutch during a negative torque upshift of the transmission, wherein the negative torque upshift is a commanded upshift of the transmission occurring when an input torque generated via the output shaft is negative; and a controller in communication with the prime mover, the transmission, and the input clutch, wherein the controller is operable to control the negative torque upshift, and wherein the controller includes:

a torque request module programmed to limit a rate of the input torque into the transmission during the negative torque upshift;

an offgoing control module programmed to determine an actual offgoing clutch torque capacity of the offgoing clutch, to calculate an actual offgoing clutch pressure using the actual offgoing clutch torque capacity, and to control the offgoing clutch through the negative torque upshift using the actual offgoing clutch pressure; and an oncoming control module programmed to control the oncoming clutch through multiple stages of control of the oncoming clutch, including each of a fill, staging, ramp, and quick-lock stage of the control.

2. The vehicle of claim 1, wherein the offgoing control module includes proportional-integral-derivative (PID) control logic, and provides closed-loop pressure correction via the PID control logic through an inertia phase and a torque phase of the negative torque upshift.

3. The vehicle of claim 1, wherein the input clutch is a hydrodynamic torque converter having a turbine and the prime mover includes an internal combustion engine, and wherein the controller is programmed to detect the negative torque upshift by comparing a difference in a speed of the engine and a speed of the turbine of the hydrodynamic torque converter to a calibrated threshold.

4. The vehicle of claim 1, wherein the torque request module is programmed to limit the rate of the input torque into the transmission during a first interval of the negative torque upshift, and to thereafter decrease the input torque to a threshold torque level.

5. The vehicle of claim 1, wherein the offgoing control module commands a ramped decrease in clutch pressure to the offgoing clutch to thereby cause the offgoing clutch to slip during a slip phase of the negative torque upshift.

6. A transmission assembly for a vehicle having an engine and an input clutch, the transmission assembly comprising:

a transmission that is selectively connected to the engine, and that has a plurality of friction clutches, at least one of which acts as a respective offgoing clutch and another at least one of which acts as an oncoming clutch during a negative torque upshift of the transmission, wherein the negative torque upshift is a commanded upshift of the transmission occurring when an input torque generated via the output shaft is negative; and a controller in communication with the transmission, wherein the controller is operable to control the negative torque upshift, and wherein the controller includes:

a torque request module programmed to limit a rate of the input torque into the transmission from the engine during the negative torque upshift;

an offgoing control module programmed to determine an actual offgoing clutch torque capacity of the offgoing clutch, to calculate an actual offgoing clutch pressure using the actual offgoing clutch torque capacity, and to control the offgoing clutch through the negative torque upshift using the actual offgoing clutch pressure; and an oncoming control module programmed to control the oncoming clutch through multiple stages of control of the oncoming clutch, including each of a fill, staging, ramp, and quick-lock stage of the control.

7. The transmission assembly of claim 6, wherein the offgoing control module includes proportional-integral-derivative (PID) control logic, and provides closed-loop pressure correction via the PID control logic through an inertia phase and a torque phase of the negative torque upshift.

8. The transmission assembly of claim 6, wherein the input clutch is a hydrodynamic torque converter having a turbine and the prime mover includes an internal combustion engine, and wherein the controller is programmed to detect the negative torque upshift by comparing a difference in a speed of the engine and a speed of the turbine of the hydrodynamic torque converter to a calibrated threshold.

9. The transmission assembly of claim 6, wherein the torque request module is programmed to limit the rate of the input torque into the transmission during a first interval of the negative torque upshift, and to thereafter decrease the input torque to a threshold torque level.

10. The transmission assembly of claim 6, wherein the offgoing control module commands a ramped decrease in clutch pressure to the offgoing clutch to thereby cause the offgoing clutch to slip during a slip phase of the negative torque upshift.

11. A method for controlling a negative torque upshift in a vehicle having a prime mover with an output shaft, an input clutch, a transmission having a plurality of friction clutches, at least one of which acts as a respective offgoing clutch and another at least one of which acts as an oncoming clutch during a negative torque upshift of the transmission, and a controller, the method comprising:

limiting a rate of input torque from the engine into the transmission via a torque request module of the controller during the negative torque upshift;

determining an actual offgoing clutch torque capacity of the offgoing clutch, via an offgoing control module of the controller;

calculating an actual offgoing clutch pressure using the actual offgoing clutch torque capacity;

controlling the offgoing clutch through the negative torque upshift using the actual offgoing clutch pressure; and controlling the oncoming clutch through multiple stages of control of the oncoming clutch, via an oncoming control module, wherein the multiple stages of control include each of a fill, staging, ramp, and quick-lock stage of the control.

12. The method of claim 11, wherein the offgoing control module includes proportional-integral-derivative (PID) control logic, further comprising providing closed-loop pressure correction via the PID control logic through an inertia phase and a torque phase of the negative torque upshift.

13. The method of claim 11, wherein the input clutch is a hydrodynamic torque converter having a turbine and the prime mover includes an internal combustion engine, further comprising detecting the negative torque upshift by comparing, via the controller, a difference in a speed of the engine and a speed of the turbine of the hydrodynamic torque converter to a calibrated threshold.

14. The method of claim 11, further comprising limiting the rate of the input torque into the transmission, via the torque request module, during a first interval of the negative torque upshift, and thereafter decreasing the input torque to a threshold torque level.

15. The method of claim 11, further comprising commanding a ramped decrease in clutch pressure to the offgoing clutch via the offgoing control module to thereby cause the offgoing clutch to slip during a slip phase of the negative torque upshift.

* * * * *